United States Patent [19]
Wieland et al.

[11] Patent Number: 5,218,615
[45] Date of Patent: Jun. 8, 1993

[54] FURNACE LINING AND LINING BRICK THEREFOR WITH IMPROVED HEAT ABSORBING CHARACTERISTICS

[75] Inventors: Klaus Wieland; Bernhard Schmalenbach, both of Wiesbaden; Dieter Schlacht, Taunusstein, all of Fed. Rep. of Germany

[73] Assignee: Didier-Werke AG, Wiesbaden, Fed. Rep. of Germany

[21] Appl. No.: 752,013

[22] Filed: Aug. 29, 1991

[30] Foreign Application Priority Data

Sep. 8, 1990 [DE] Fed. Rep. of Germany ....... 4028612

[51] Int. Cl.$^5$ .............................................. F27D 1/00
[52] U.S. Cl. ........................................ 373/71; 373/30; 373/44; 373/72; 373/75; 373/137; 373/155; 432/247
[58] Field of Search ................. 373/29, 30, 44, 45, 373/71, 72, 75, 76, 137, 155, 156, 164, 162; 52/232, 270; 432/252, 247

[56] References Cited

U.S. PATENT DOCUMENTS

| | | | |
|---|---|---|---|
| 2,462,289 | 2/1949 | Rochon | 373/137 |
| 3,086,327 | 4/1963 | Samuel et al. | 373/137 |
| 3,605,370 | 9/1971 | Prible | 373/137 |

FOREIGN PATENT DOCUMENTS 2814250 10/1978 Fed. Rep. of Germany.
8229588.3 10/1984 Fed. Rep. of Germany.

OTHER PUBLICATIONS

Trier: Glasschmelzöfen; Springer, Berlin 1984; Seiten 29 and 30.

Primary Examiner—Bruce A. Reynolds
Assistant Examiner—Tu Hoang
Attorney, Agent, or Firm—Wenderoth, Lind & Ponack

[57] ABSTRACT

A furnace lining is formed by a plurality of lining bricks. The bricks have surfaces defining an internal surface of the lining that is to face the interior of the furnace and to receive therefrom radiant heat. At least one depression is formed in the lining and opens onto the surface through an opening. The depression has internal wall surfaces that are geometrically configured to cause radiant heat from the furnace interior that impinges on a first internal wall surface to be reflected thereby and to impinge therefrom onto a second internal wall surface. Thus, the heat will be absorbed by the bricks of the lining, and such heat will be emitted thereby from the inner surface thereof.

61 Claims, 3 Drawing Sheets

FURNACE LINING AND LINING BRICK THEREFOR WITH IMPROVED HEAT ABSORBING CHARACTERISTICS

BACKGROUND OF THE INVENTION

The present invention relates to a lining for the interior of a furnace, for example a refractory lining to be employed in a furnace to melt glass. The present invention also relates to lining brick configurations employable for forming such furnace lining.

More particularly, the present invention relates to such lining brick or furnace lining having therein at least one depression defining internal wall surfaces that reflect radiant heat impinging thereon from the interior of the furnace through an opening in the inner surface of the lining brick or lining leading to the depression.

A lining brick and furnace lining of this type are disclosed in German DE 28 14 250 wherein depressions are designed in a manner such that heat reflecting surfaces thereof are as large as possible. To achieve such end, the depressions are configured in the shapes of pyramidal or conical frustrums. As such, the opening from the furnace interior into each depression forms the largest part of each depression. In other words, the cross-sectional area of the opening of each depression is larger than all internal cross-sectional areas of such depression. Therefore, the maximum amount of radiant heat striking the furnace lining is reflected onto the glass to be melted. This is said to be done in order to increase the efficiency of the glass-melting furnace. However, in such arrangement the heat radiation impinging on the surfaces of the depressions is reflected predominantly directly back into the interior of the furnace chamber, similar to the manner of reflection in a furnace having a smooth dome, i.e. without depressions. With such reflection of flame and gas heat radiation, reabsorption occurs. This reabsorbed radiation energy does not reach the material, for example glass, to be heated.

It has been found that increasing the heat reflection capabilities of the furnace lining does not lead to further improvements, since a portion of the reflected thermal radiation is reabsorbed by the source of such radiation, i.e. the flame employed to emit the heat, due to identical wave lengths.

SUMMARY OF THE INVENTION

With the above discussion in mind, it is an object of the present invention to provide a furnace lining and lining brick therefor, but which are provided with improved heat absorbing characteristics.

It is a further object of the present invention to provide such a furnace lining and lining brick operable to and capable of emitting increased thermal radiation. It is a more particular object of the present invention to provide such improved emission of thermal radiation by the furnace lining or lining brick with corresponding reduction of reflection of thermal radiation from the lining back to the furnace interior. In other words, in accordance with the present invention, the thermal radiation is not directly reflected from the furnace lining back into the furnace interior, but rather is absorbed by the furnace lining and then emitted therefrom to the material in the furnace to be heated.

These objects are achieved in accordance with the present invention by the provision that the furnace lining or lining brick is provided with depressions defining internal wall surfaces having a geometrical configuration such that the radiant heat reflected by one internal wall surface of a depression impinges on another internal wall surface of the depression, and thus is absorbed by the lining brick or bricks forming the furnace lining.

Therefore, in accordance with the present invention, the direct reflection of the thermal radiation from the furnace lining back into the furnace interior is reduced. Rather, in each depression a large portion of the radiant heat is reflected, but such reflection is in a direction to again strike another internal surface of the lining or the brick, thereby absorbing such thermal radiation. The heat absorbed by the lining brick or furnace lining in turn is emitted thereby and thus is supplied to the furnace interior, and particularly to the material therein to be heated. However, the thermal radiation that is emitted by the furnace lining and lining bricks, after being absorbed due to the unique configurations of the present invention, is of a changed or different wave length. As a result, larger amounts of this radiation reach the material to be heated than is possible in accordance with the prior art.

Employing a glass melting furnace as an example, the configurations of the present invention result in a reduction of the temperature of the lining required to melt the glass in the furnace, since the quantity of heat necessary to achieve such melting still can be emitted by the furnace lining into the furnace interior at a lower temperature of the lining. The result is that the temperature of the flue gas is lower and heat losses are reduced. On the other hand, if the temperature of the lining is not reduced, then it is possible in accordance with the present invention to increase the quantity of glass to be melted and to improve the quality of the glass due to a more rapid and uniform melting of such glass quantity.

In particular accordance with the present invention, there is provided a furnace lining of a furnace having an interior adapted to contact therein a molten material, for example molten glass. The lining has a surface to face the interior of the furnace and to receive therefrom radiant heat. At least one depression is formed in the lining and opens onto the surface through an opening therein. The depression has internal wall surfaces receiving and reflecting radiant heat from the furnace interior that enters the depression through the opening. These internal wall surfaces of the depression have particular geometric configurations causing the radiant heat impinging on a first internal wall surface and reflected thereby to impinge therefrom onto a second wall surface and thus to be absorbed by the lining. This radiant heat absorbed by the lining then is emitted by the lining back into the interior of the furnace. However, such heat will be at a different wave length and thereby will be directed to the material to be heated. The geometrical configuration particularly is such that radiant heat from the furnace interior that passes through the opening perpendicularly to the plane thereof impinges on the first wall surface and is reflected thereby to impinge on the second wall surface. Even further, the geometrical configuration preferably is such that as much as possible, preferably a predominant amount and particularly further preferably substantially all, of the radiant heat passing through the opening perpendicularly to the plane thereof is absorbed by the lining. In further accordance with the present invention, there is provided a lining brick to be employed with other lining bricks to form such furnace lining. The lining brick has a surface to face the interior of the furnace. The brick has formed therein and extending from the furnace in a direction to be away from the furnace interior, means for at least partially defining a depression or depressions to be formed in the lining and for at least partially defining the opening or openings into such depression or depressions from such surface. Such means may be a recess or recesses entirely formed in each brick. However, such means may be a recess or surface of one brick and employable in cooperation with a recess or surface of another adjacent brick of the lining to define the depression. The depressions may be of a number of specific configurations, to be discussed in more detail below, performing advantageously the above discussed desired function of the present invention of enabling the furnace lining to absorb radiant heat, rather than directly reflect such heat.

BRIEF DESCRIPTION OF THE DRAWINGS

Other objects, features, advantages and specific geometrical configurations in accordance with the present invention will be described in detail below, with reference to the accompanying drawings, wherein.

DETAILED DESCRIPTION OF THE INVENTION

Figure 2:
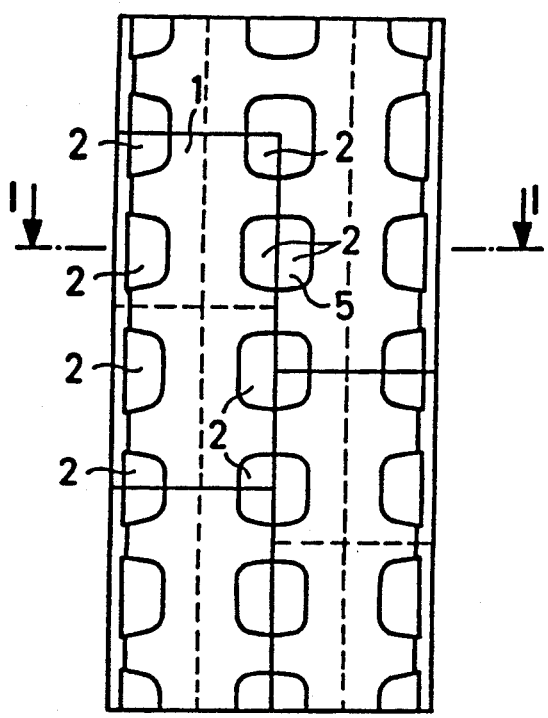
FIG. 2 is a plan view in the direction of arrow 2 of FIG. 1.
Figure 1:
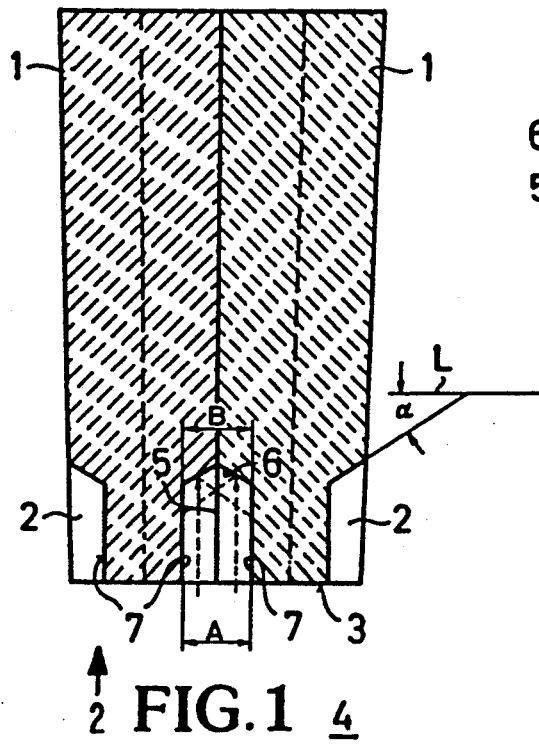
FIG. 1 is a cross-sectional view through a furnace lining in a dome portion of a furnace in accordance with one embodiment of the present invention, and taken along line 1—1 of FIG. 2.

Illustrated in FIGS. 1 and 2 are a plurality of lining bricks 1 formed of a suitable refractory ceramic material, as would be understood by one skilled in the art, assembled together to form a furnace lining. Bricks 1 have internal surfaces 3 defining an internal furnace lining surface that faces an interior 4 of a furnace that is adapted to contain material that is to be melted, for example glass. Radiant heat will be reflected from the interior 4 toward the furnace lining. This is somewhat schematically illustrated by the dashed line arrows in FIG. 1. In the arrangement of FIGS. 1 and 2, the bricks 1 each have formed therein a plurality of recesses 2. In the example illustrated, each brick 1 has formed therein eight recesses 2. Two recesses of two adjacent bricks are confronted or cooperated to form a depression 5. Thus, as shown in FIG. 2, the furnace lining is provided with a large number of depressions 5.

Each depression 5 is closed except for an opening directed toward and communicating with the interior 4. In other words, the interior of depression 5 opens to the furnace interior 4 through such opening. In this embodiment of the present invention, the cross-sectional area A of the opening of depression 5 is no larger than the cross-sectional area B of the largest or widest portion of the interior of depression 5.

In the embodiment of FIGS. 1 and 2, each depression 5 is defined by internal wall surfaces including bottom wall surfaces 6 that define a bottom or base of depression 5 and side wall surfaces 7. In accordance with the present invention, the geometric configuration of these internal wall surfaces is such that radiant heat from furnace interior 4 will enter depression 5 through the opening thereof and will impinge on at least one first internal wall surface and be reflected thereby to impinge therefrom onto at least one second internal wall surface and thus be absorbed by the furnace lining. Particularly, in the embodiment of FIGS. 1 and 2, the internal wall surfaces 6, 7 are configured such that radiant heat from furnace interior 4 will impinge on bottom wall surfaces 6 and be reflected thereby to impinge on side wall surfaces 7. As a result, the radiant heat will not be reflected back into the furnace interior, but rather will be absorbed by the bricks 1 forming the furnace lining. This manner of reflection is illustrated by the dashed line arrows in FIG. 1. More particularly, in the arrangement of this embodiment of the present invention, each bottom wall surface 6 extends at an acute angle $a$ to a line L. This line is parallel to surface 3 and therefore also is parallel to the plane of the opening into depression 5. As illustrated in FIG. 1, side wall surfaces 7 are perpendicular to surface 3 and therefore also to the plane of the opening. Such surfaces however may form acute angles to the plane of surface 3, whereby cross-sectional area A will be less than cross-sectional area B.

Figure 3:
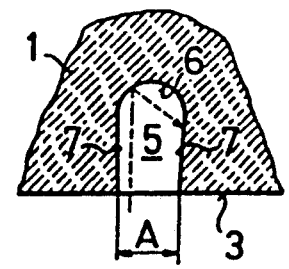
FIG. 3 is a partial cross-sectional view of another embodiment in accordance with the present invention.
Figure 4:
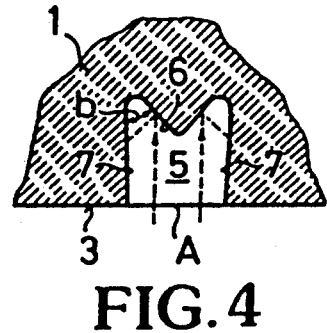
FIG. 4 is a view similar to FIG. 3 but of a yet further embodiment in accordance with the present invention.

FIG. 3 illustrates an embodiment similar to the embodiment of FIG. 1, but wherein the bottom wall surface 6 is concave. FIG. 4 illustrates a similar arrangement, but wherein the bottom wall surface 6 is convex. Particularly, bottom wall surface 6 extends at an acute angle $b$ to side wall surface 7.

FIGS. 3 and 4 illustrate a further feature of the present invention. Namely, the depression 5 may be formed entirely in a single brick 1. This feature may be employed in any of the embodiments of the present invention.

It is to be noted that in the embodiments of FIGS. 1-4, the side surfaces 7 are perpendicular to surface 3 and the plane of the opening. As a result, cross-sectional area A is equal to cross-sectional area B. The configurations of the bottom wall surfaces 6 ensure that a large portion of the thermal radiation reflected from bottom wall surfaces 6 will impinge on and be absorbed at the side walls 7. Depending on the configuration of the bottom wall surface 6, the heat absorbed at the side walls 7 can be increased if the side walls 7 are configured to taper conically or pyramidally in a manner such that the cross-sectional area A will be less than the cross-sectional area B.

Figure 5:
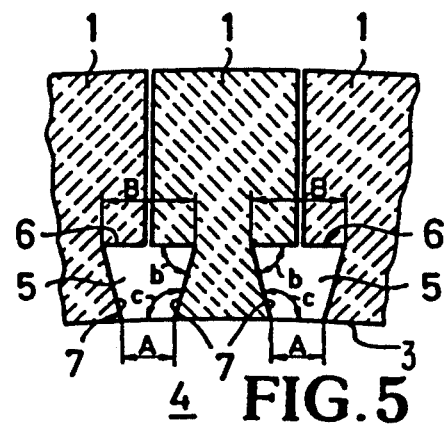
FIG. 5 is a view somewhat similar to FIG. 4 but of a still further embodiment of the present invention.

For example, in the embodiment illustrated in FIG. 5, the bottom wall surfaces 6 are parallel (or substantially parallel) to the surface 3 and therefore to the planes of the openings of depressions 5. To provide substantial absorption of the radiant heat, the side wall surfaces 7 are inclined to bottom wall surfaces 6 and to surface 3. Particularly, side wall surface 7 extends at an acute angle $b$ to respective bottom wall surface 6. Furthermore, each side wall surface 7 extends at an obtuse angle $c$ to the plane of the opening. As such, substantial of the radiant heat impinging on bottom wall surfaces 6 will be reflected thereby and impinge on the side wall surfaces 7 and be absorbed thereat.

Figure 6:
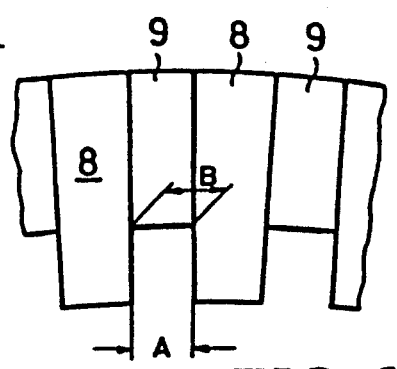
FIG. 6 is a schematic view illustrating yet another embodiment of the present invention.

The embodiment of FIG. 6 illustrates an arrangement whereby a depression 5 is not formed by two bricks 1 provided with respective recesses 2. Rather, depression 5 is defined by three adjacent bricks, namely one relatively short brick 9 and two relatively long bricks 8 on opposite sides of brick 9. The inner surface of shorter brick 9 defines bottom wall surface 6. This surface however can be formed in the manner of any of the other embodiments of the present invention. Side surfaces of longer bricks 8 define side wall surfaces 7. The cross-sectional area A is smaller than or equal to the cross-sectional area B in the area of the bottom of the depression. This is achieved by forming the bricks 8 and/or 9 to taper conically or pyramidally.

In the embodiments of FIGS. 5 and 6, if the cross-sectional area A is less than the cross-sectional area B, then the side wall surfaces 7 are inclined relative to the surfaces 3, i.e. at acute angles relative thereto. Side wall surfaces 7 then themselves will reflect a part of the radiant heat that was reflected thereto from bottom wall surfaces 6 back into depression 5. In other words, radiant heat striking surface 6 will reflect to surface 7. This reflection will substantially be absorbed, but at least a portion thereof that is not absorbed will be reflected thereby to impinge upon another internal wall surface in depression 5. This further facilitates the desired absorption of radiant heat within the lining brick and the furnace lining.

The heat absorbed in the lining bricks due to the above described reflections of the radiant heat internally of depressions 5 is emitted by the bricks at surfaces 3 into the furnace interior 4. The thermal radiation reflected by the lining directly back into the furnace interior 4 is decreased as a result of the absorption in accordance with the present invention, and the amount of heat emitted by the bricks of the furnace lining to the furnace interior is increased. Therefore, it is possible to reduce the temperature of the furnace lining, since the amount of heat required to melt the glass in the furnace interior 4 is emitted at a lower temperature.

Figure 7:
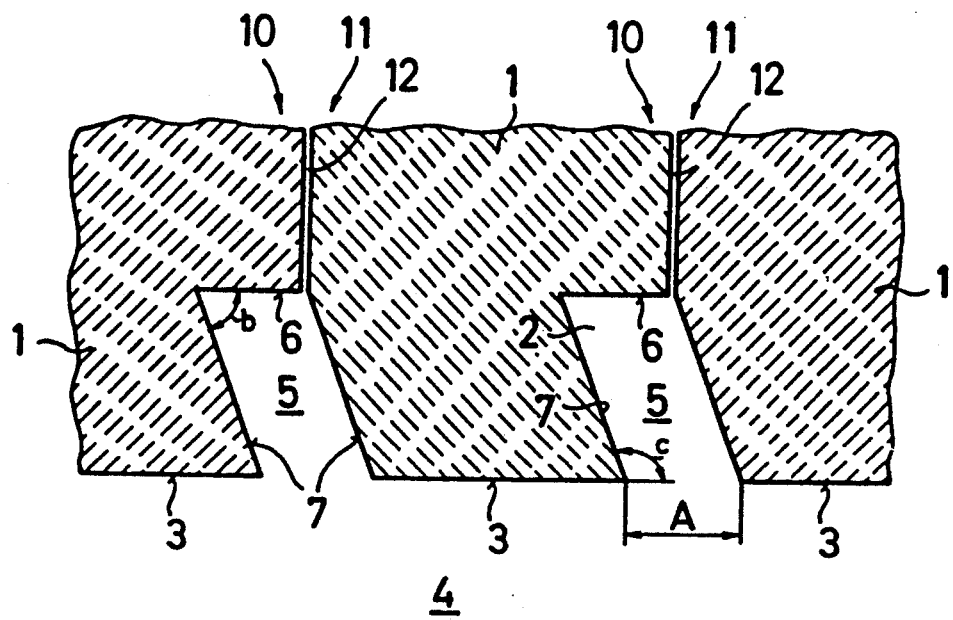
FIGS. 7-10 are views similar to FIG. 1 but illustrating even further embodiments of the present invention.

FIG. 7 illustrates an arrangement somewhat modified from that of the embodiment of FIG. 5. Thus, the recess 2 is formed only in one side 10 of brick 1 and not in the confronting side 11 of an adjacent brick. Recess 2 defines bottom wall surface 6 and one of the side wall surfaces 7 of depression 5. The other side wall surface 7 is formed by a surface, for example planar, on the side 11 of the confronting brick. The side wall 7 defining recess 2 extends at an obtuse angle c to the plane of the opening into the depression 5. This same side wall surface 7 defining recess 2 extends at an acute angle b relative to bottom wall surface 6. The two side walls 7 extend approximately parallel.

Figure 8:
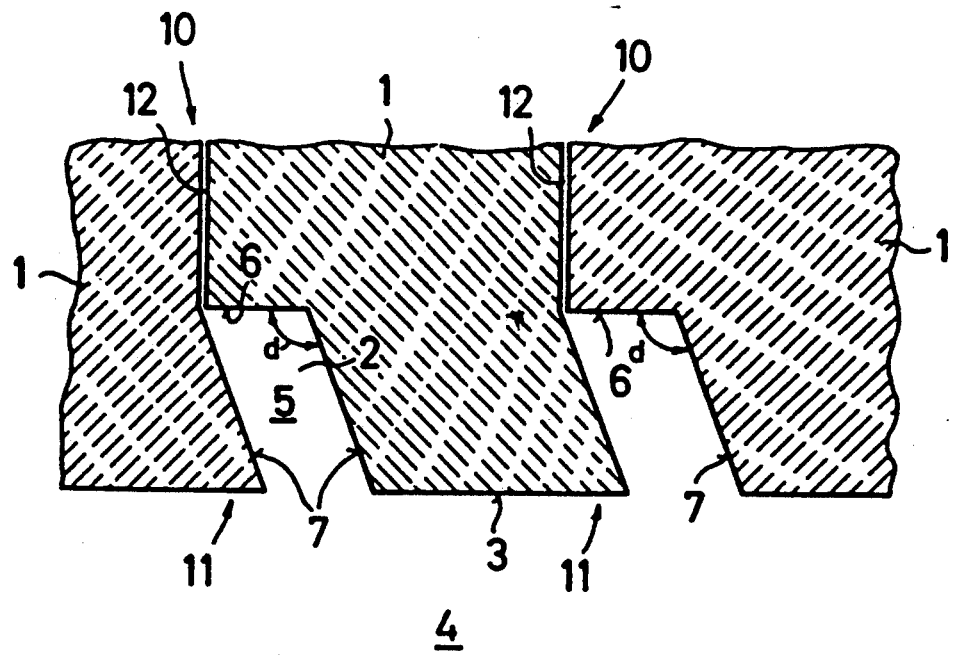

The embodiment of FIG. 8 is similar to that of FIG. 7. However, the side wall surface 7 defining recess 2 extends at an obtuse angle d relative to bottom wall surface 6. This same side wall 7 that defines recess 2 in the brick 1 extends at an acute angle to the plane of the opening into depression 5. In this embodiment, a joint 12 between two adjacent bricks 1 is shielded from direct thermal radiation from the furnace interior 4. Also, the bond between two adjacent bricks 1 is improved, since they cannot substantially shift vertically relative to each other. This is due to the fact that the planar surface 7 confronting recess 2 and defining therewith the depression 5 extends essentially into recess 2.

In the embodiments of FIGS. 7 and 8, radiant heat is reflected from bottom wall surface 6 onto one of the side wall surfaces 7. Additionally, radiant heat from the furnace interior 4 will strike or impinge on one side wall surface 7 and be reflected therefrom to the other side wall surface and to the bottom wall surface. In the embodiments of FIGS. 7 and 8, the cross-sectional area A of the opening into the depression 5 can be larger than the cross-sectional area B adjacent the bottom wall surface 6. This is due to the fact that reflection of direct radiant heat from the furnace interior 4 will be on two surfaces, i.e. bottom wall surface 6 and one of the side wall surfaces 7. As a result, increased absorption will occur internally of the depression 5, even if the cross-sectional area A is larger than the cross-sectional area B.

Figure 9:
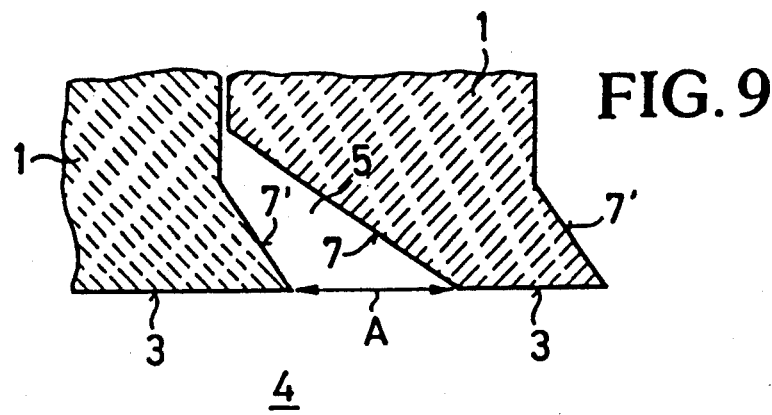

The embodiment of FIG. 9 is somewhat of a modification of the embodiments of FIGS. 7 and 8. In the embodiment of FIG. 9, depression 5 is formed essentially by two confronting surfaces of two adjacent bricks 1, without a recess as such being formed in either of the bricks. One side wall surface 7 of depression 5 extends at an obtuse angle relative to the surface 3 of the brick thereof. Another side wall surface 7' of depression 5 extends at an acute angle to the surface 3 of the brick thereof. In this embodiment, the side wall surface 7 will reflect thermal radiation entering the depression, causing such reflected thermal radiation to impinge on the other side wall surface 7'. In this embodiment, it will be apparent that the cross-sectional area A is larger than other internal cross-sectional areas of the depression 5.

Figure 10:
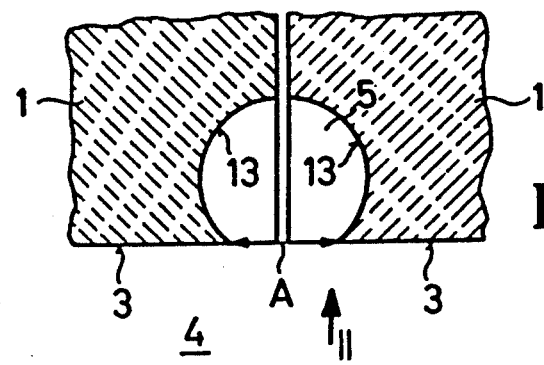
Figure 11:
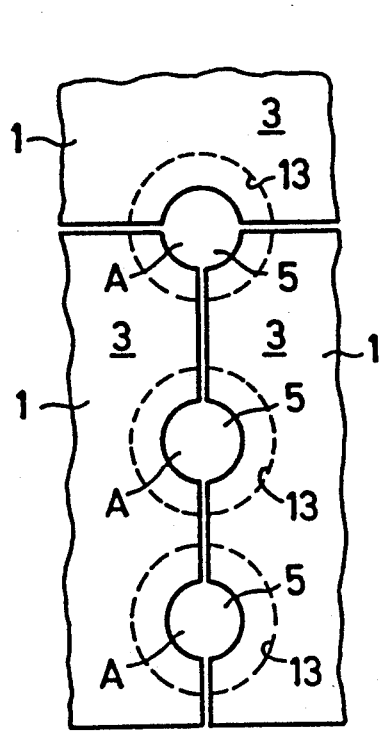
FIG. 11 is a plan view taken in the direction of arrow 11 in FIG. 10.

In the embodiment illustrated in FIGS. 10 and 11, depression 5 is defined by a continuous surface encompassing both the first internal wall surface that receives direct heat radiation from the furnace interior 4 and the second internal wall surface that receives reflected heat radiation from the first internal wall surface and absorbs such heat. Particularly, the continuous surface 13 defines depression 5 in the shape of a sphere with a segment thereof defined by the plane of the opening being removed. In other words, the plane of the opening into the depression 5 essentially removes or cuts-off a segment of the sphere that would be formed by surface 13. It will be apparent that cross-sectional area A is smaller than the largest cross-sectional area of depression 5. As with the other embodiments of the present invention, the depression 5 in this embodiment can be defined entirely in a single brick 1 or can be defined by confronting partial recesses in two adjacent bricks.

Figure 12:
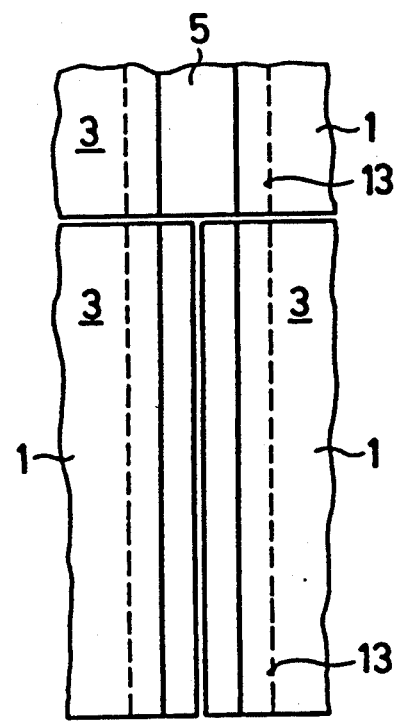
FIG. 12 is a view similar to FIG. 11 but illustrating an even further embodiment of the present invention.

In the embodiment of FIG. 12, the depression 5 is defined as a continuous groove or channel that extends longitudinally. In the particular arrangement of FIG. 12, the cross section is defined by a continuous surface 13 that may be essentially circular, similar to the embodiment of FIGS. 10 and 11. Also, this embodiment is illustrated as defining the depression in a plurality of adjacent bricks. The depression in the form of a longitudinal groove or channel however can be formed in only a single brick.

It is to be understood that although the present invention has been described with regard to a furnace lining for a furnace to melt glass, this is not intended to be limiting to the present invention. Rather, the present invention is directed to lining bricks and a furnace lining formed thereby for other types of furnaces.

Although the present invention has been described and illustrated with respect to preferred features thereof, it is to be understood that various changes and modifications may be made to the specifically described and illustrated features without departing from the scope of the present invention.

We claim:

1. A lining of a furnace having an interior adapted to contain therein molten material, said lining comprising:
   a surface to face the interior of the furnace and to receive therefrom radiant heat;
   at least one depression formed in said lining and opening onto said surface through an opening defined in a plane;
   said depression having internal wall surfaces for receiving and reflecting radiant heat from the furnace interior that enters said depression through said opening; and
   said internal wall surfaces having a geometrical configuration causing radiant heat impinging on a first said wall surface and reflected thereby to impinge therefrom onto a second said wall surface and to be absorbed by said lining, said geometrical configuration being such that a predominant portion of radiant heat from the furnace interior that passes through said opening is absorbed by said lining and is prevented from being reflected by said internal wall surfaces back into the furnace interior.

2. A lining as claimed in claim 1, wherein said geometrical configuration is such that radiant heat from the furnace interior, that passes through said opening perpendicularly to the plane said impinges on said first wall surface and is reflected thereby to impinge on said second wall surface.

3. A lining as claimed in claim 2, wherein said geometrical configuration is such that substantially all the radiant heat passing through said opening perpendicularly to said plane thereof is absorbed by said lining.

4. A lining as claimed in claim 2, comprising a plurality of said depressions formed therein.

5. A lining as claimed in claim 2, wherein said lining is formed by a plurality of lining bricks assembled together.

6. A lining as claimed in claim 5, wherein said depression is formed entirely within one said brick.

7. A lining as claimed in claim 5, wherein said depression is formed by an assembly of three adjacent said bricks including a center brick having an end surface to face the furnace interior and forming a bottom wall surface of said depression and two end bricks positioned on opposite sides of said center brick and extending further into the furnace interior than said center brick, said end bricks having side surfaces forming respective opposite side wall surfaces of said depression.

8. A lining as claimed in claim 7, wherein side surfaces of at least one of said center brick or said end bricks extend at an angle to said plane of said opening such that the cross-sectional area of said opening is less than the cross-sectional area of a largest part of the interior of said depression.

9. A lining as claimed in claim 5, wherein said depression is defined by recesses formed in two adjacent said bricks.

10. A lining as claimed in claim 5, wherein said depression is defined by a recess formed in one said brick and by a surface of an adjacent said brick.

11. A lining as claimed in claim 2, wherein said depression comprises a longitudinally extending groove.

12. A lining as claimed in claim 2, wherein said depression is defined by a continuous surface encompassing said first and second wall surfaces.

13. A lining as claimed in claim 12, wherein said depression is shaped as a sphere with a segment thereof defined by said plane being removed.

14. A lining as claimed in claim 12, wherein said depression has a circular cross section parallel to said plane.

15. A lining as claimed in claim 2, wherein said first wall surface extends at an obtuse angle to said plane, and said second wall surface extends at an acute angle to said plane.

16. A lining as claimed in claim 2, wherein said first wall surface extends at an acute first angle to said plane, and said second wall surface extends relative to said plane at a second angle greater than said acute first angle.

17. A lining as claimed in claim 16, wherein said second angle is no more than 90°.

18. A lining as claimed in claim 2, wherein said first wall surface extends parallel to said plane, and said second wall surface extends at an obtuse angle to said plane.

19. A lining as claimed in claim 2, wherein said opening has a cross-sectional area no greater than a cross-sectional area of a largest part of an interior of said depression.

20. A lining as claimed in claim 2, wherein said depression has opposite side wall surfaces extending at respective angles to said plane.

21. A lining as claimed in claim 20, wherein said opposite side wall surfaces are parallel.

22. A lining as claimed in claim 21, wherein said opposite side wall surfaces are perpendicular to said plane.

23. A lining as claimed in claim 20, wherein at least one of said respective angles to said plane is obtuse.

24. A lining as claimed in claim 23, wherein said respective angles of said opposite wall surfaces to said plane are obtuse.

25. A lining as claimed in claim 23, wherein another said respective angle to said plane is acute.

26. A lining as claimed in claim 2, wherein said depression includes a bottom defined by at least one bottom wall surface.

27. A lining as claimed in claim 26, wherein said bottom wall surface is parallel to said plane.

28. A lining as claimed in claim 26, wherein said bottom wall surface is concave.

29. A lining as claimed in claim 26, wherein said bottom wall surface is convex.

30. A lining as claimed in claim 29, wherein said bottom wall surface extends at an acute angle relative to a side wall surface of said depression.

31. A lining as claimed in claim 26, wherein said bottom wall surface extends at an acute angle relative to a side wall surface of said depression.

32. A lining as claimed in claim 26, wherein said bottom wall surface extends at an obtuse angle relative to a side wall surface of said depression.

33. A lining brick to be used with other lining bricks to form a lining of a furnace having an interior adapted to contain therein molten material, said lining brick comprising:
   a surface to face the interior of the furnace and to receive therefrom radiant heat;
   means, formed in said brick and extending from said surface in a direction to be away from the furnace interior, for at least partially defining a depression to be formed in the lining and for at least partially defining an opening into the depression from said surface, the opening being defined in a plane; and said means including at least one internal wall surface of the depression for receiving and reflecting radiant heat from the furnace interior through the opening, said at least one internal wall surface comprising at least one wall surface of said brick having a geometrical configuration causing radiant heat impinging on a first wall surface of the depression and reflected thereby to impinge therefrom onto a second wall surface of the depression and to be absorbed by said brick or by other bricks of the lining, said geometrical configuration being such that a predominant portion of the radiant heat from the furnace interior that passes through the opening is absorbed by the lining and is prevented from being deflected by said at least one wall surface back into the furnace interior.

34. A lining brick as claimed in claim 33, wherein said geometrical configuration is such that radiant heat from the furnace interior that passes through said opening perpendicularly to said plane thereof impinges on the first wall surface and is reflected thereby to impinge on the second wall surface.

35. A lining brick as claimed in claim 34, comprising a plurality of said depression defining means formed therein.

36. A lining brick as claimed in claim 34, wherein said means comprises a recess formed in said brick and entirely defining the depression.

37. A lining brick as claimed in claim 34, wherein said means comprises a recess formed in said brick for cooperation with a recess to be formed in an adjacent brick of the lining to define the depression.

38. A lining brick as claimed in claim 37, wherein said at least one internal wall surface comprises at least a side wall surface of the depression.

39. A lining brick as claimed in claim 38, wherein said side wall surface extends relative to said surface and to the plane of the opening at an angle of no more than 90°.

40. A lining brick as claimed in claim 39, wherein said angle is an acute angle.

41. A lining brick as claimed in claim 37, wherein said at least one internal wall surface comprises at least a bottom wall surface and a side wall surface of the depression.

42. A lining brick as claimed in claim 41, wherein said bottom wall surface is parallel to said surface and to the plane of the opening.

43. A lining brick as claimed in claim 41, wherein said bottom wall surface is concave.

44. A lining brick as claimed in claim 43, wherein said bottom wall surface extends at an obtuse angle to said side wall surface.

45. A lining brick as claimed in claim 41, wherein said bottom wall surface is convex.

46. A lining brick as claimed in claim 41, wherein said bottom wall surface extends at an acute angle to said side wall surface.

47. A lining brick as claimed in claim 34, wherein said means comprises a recess formed in said brick for cooperation with a surface of an adjacent brick of the lining to define the depression.

48. A lining brick as claimed in claim 47, wherein said at least one internal wall surface comprises at least a side wall surface of the depression.

49. A lining brick as claimed in claim 48, wherein said side wall surface extends at an acute angle relative to said surface.

50. A lining brick as claimed in claim 48, wherein said side wall surface extends at an obtuse angle relative to said surface.

51. A lining brick as claimed in claim 48, wherein said at least one internal wall surface comprises at least a bottom wall surface and a side wall surface of the depression.

52. A lining brick as claimed in claim 51, wherein said bottom wall surface is parallel to said surface and to the plane of the opening.

53. A lining brick as claimed in claim 51, wherein said bottom wall surface extends at an obtuse angle to said side wall surface.

54. A lining brick as claimed in claim 51, wherein said bottom wall surface extends at an acute angle to said side wall surface.

55. A lining brick as claimed in claim 34, wherein said means comprises a side surface extending from said surface in said direction and to be positioned to confront a recess in an adjacent brick of the lining to define the depression.

56. A lining brick as claimed in claim 55, wherein said side surface is planar.

57. A lining brick as claimed in claim 55, wherein said side surface extends at an acute angle to said surface.

58. A lining brick as claimed in claim 57, wherein said side surface extends at an obtuse angle to said surface.

59. A lining brick as claimed in claim 34, wherein said means comprises a longitudinally extending groove.

60. A lining brick as claimed in claim 34, wherein said means is defined by a continuous surface.

61. A lining brick as claimed in claim 60, wherein said continuous surface forms at least part of a sphere with a segment thereof removed.

* * * * *